Oct. 12, 1926.
H. C. DORTON
ANIMAL TRAP
Filed March 2, 1925
1,602,655
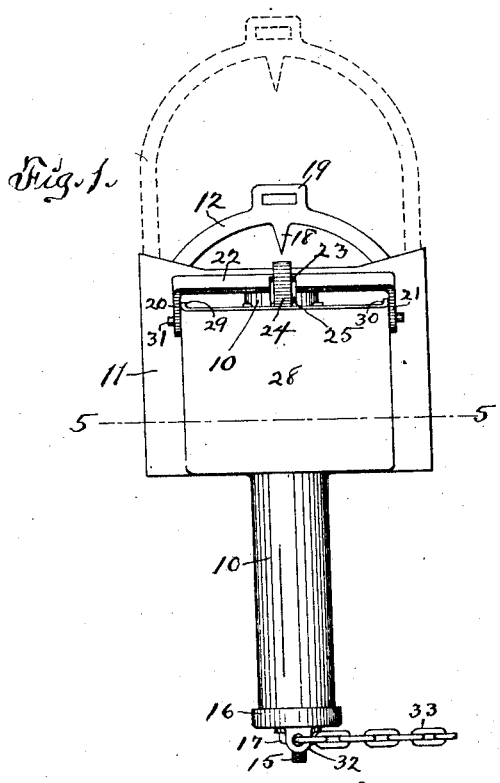
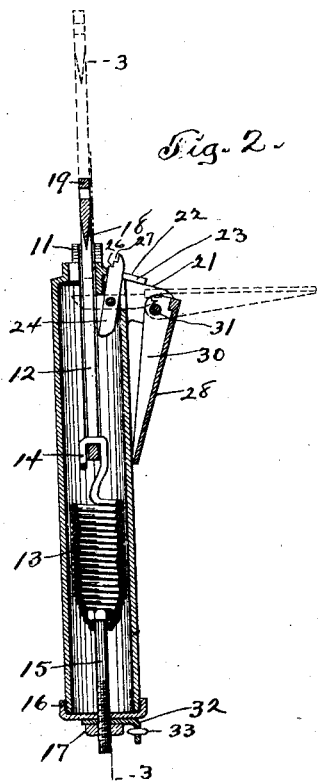
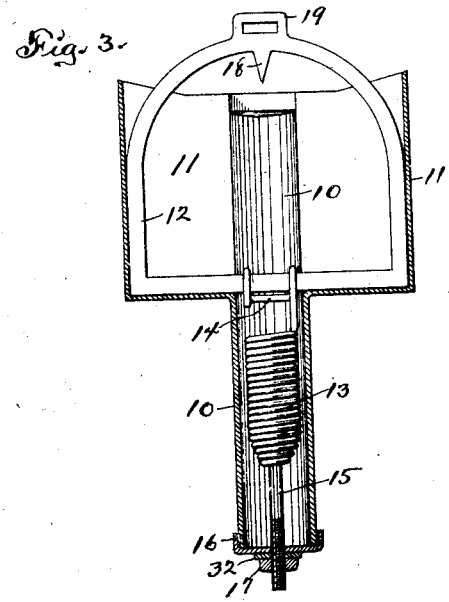
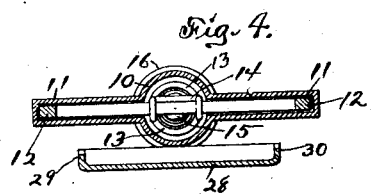
INVENTOR
Henry C. Dorton
BY
ATTORNEY Patented Oct. 12, 1926.

1,602,655

UNITED STATES PATENT OFFICE.

HENRY C. DORTON, OF FONDA, IOWA.

ANIMAL TRAP.

Application filed March 2, 1925. Serial No. 12,787.

An object of this invention is to provide an improved construction for an animal trap adapted to be manually set and sprung by an animal passing through the same.

A further object of this invention is to provide improved means for adjusting the set of a trap in relation to the force required to spring the same.

A further object of this invention is to provide means inherent in a trap adapted to kill the animal substantially simultaneously with the self-springing thereof, thereby providing humane treatment for the trapped animal.

A further object of this invention is to provide improved means for setting the trap.

My invention consists in the construction, arrangement and combination of elements hereinafter set forth, pointed out in the claims and illustrated by the accompanying drawing, in which—

Figure 1 is an elevation of the trap in sprung condition, dotted lines indicating positions of parts in set condition. Figure 2 is a vertical section substantially centrally of the device, at right angles to Figure 1. Figure 3 is a vertical section of the device on the indicated line 3—3 of Figure 2. Figure 4 is a cross-section on the indicated line 5—5 of Figure 1.

In the construction of the device as shown a base member or housing is provided, composed of a barrel 10, substantially cylindrical in form and a slide bearing portion 11 relatively flat, rectangular in face elevation, intersected by and projecting radially on opposite sides of the barrel. The slide bearing portion and the barrel preferably are integral and made in two sections by pressing or stamping and thereafter connected rigidly to form a hollow body. The upper portions of the slide bearing provide lower jaws for the trap in operation. A jaw plate 12 is constructed preferably of a single piece of metal of endless annular form, circular in its upper portion and square in its lower portion, and is slidingly mounted in the slide bearing 11, said bearing being open at its top and closed at its bottom except where it is intersected by the barrel 10. A retractile coil spring 13 is mounted loosely in the barrel 10 and is formed with a relatively wide double hook 14 on its upper end adapted to be hooked over the lower end bar of the jaw plate 12.

The lower end portion of the spring 13 is contracted in diameter and a bolt 15 is mounted with its head therein and its shank extending outwardly through an opening in said contracted end portion. The bolt 15 extends through a central hole in a cap 16 adapted to be screwed on the lower end of the barrel 10 and a nut 17 is screwed on the lower end portion of the bolt whereby tension may be adjusted in the spring and the several parts connected for operation. When the trap is sprung, the jaw plate 12 contacts at its lower end with the bottom portion of the slide bearing and is held firmly in such position by tension of the spring 13, said spring also providing the force necessary to move the jaw plate inwardly when the trap is sprung. The jaw plate 12 also is formed with a spike projecting inwardly at the apex of its arched upper portion. It is also formed with a slotted ear or extension 19 outwardly from the apex of its arched upper portion for convenience and safety in setting the trap as hereinafter set forth. Ears 20, 21 are formed on or fixed to and project outwardly from one plate of the slide bearing portion on opposite sides of and spaced from the barrel 10 and a bridge or flange 22, having a central outwardly-opening notch 23, connects the inner portions of said ears. A trigger is pivoted in the upper portion of the barrel 10 on an axis at one side of the bearing portion 11 and extends through a slot 25 in said barrel. The trigger has a horizontal axis and is adapted to extend at times diametrically of but not entirely across the barrel. The inner end portion of the trigger 24 is adapted to engage beneath the lower end bar of the jaw plate 12 and sustain said jaw plate against the pull of the spring 13 at times. The outer end portion of the trigger 24 is formed with two lips 26, 27, or ledges, end to end and in different planes. A pan 28, having side flanges 29, 30 is pivoted at ends of said flanges on a rod 31 extending through and connecting the ears 20, 21 and is adapted to move through an arc between vertical and horizontal positions (Fig. 2), being in vertical position when the trap is sprung. The inner marginal portion of the pan 28 is adapted to engage one or the other of the lips 26, 27 and hold the trigger in set position, thereby resisting the pull of the spring 13. An angle plate 32 is formed with a hole in each portion thereof and is mounted by one of said holes on the bolt 15 and is held in place by the nut 17, while a chain 33 is attached thereto by means of the other hole. The chain 33 may be provided with a loop in its outer end portion. The trap may be set as follows: The operator places a foot in the loop of the chain 33 and a tool, such as pliers, screwdriver or hand hook, in the slot of the ear 19 and pulls upwardly on said tool against the resistance of his foot in the chain, thereby drawing the jaw plate 12 outwardly relative to the slide bearing portion 11 and against the pull of the spring 13 to such extent as to permit of placing the trigger in engagement with the bottom of the jaw plate and the pan in engagement with the lip 26 thereof to hold the same in set position.

This trap preferably is made in three sizes: the smallest for muskrats, mink and the like; the medium for otter, raccoons and the like; and the largest for wolves, coyotes and foxes and the like.

In use, the trap is preferably set in runways or at the mouths of burrows or house openings, and is inserted in a sufficient excavation in the ground so that the barrel and most of the bearing portion 11 are buried, the pan 28 being very close to the normal surface and extending in the direction that an animal may be assumed to travel in approaching the trap. A cloth dipped in water may be extended through the jaw plate and spread over the bearing portion 11 and pan and covered with a light coating of sand or soil. Bait may be so placed as to lure the animal through the opening of the jaw plate 12. The visibility of the jaw plate is not material, since it is the common practice of fur-bearing animals, such as are above noted, to pass freely and fearlessly through any holes or openings observed by them. A hair-trigger set may be made by engaging the pan with the lip 27. The animal will spring the trap by engaging the pan 28 with a forefoot, thus withdrawing the pan from the trigger 24 and permitting the jaw plate 12 to be drawn inwardly and forcibly by the spring 13, the trigger rotating out of the way of the lower bar of the plate. When the trap is sprung, the spike 18 will strike the animal in or near the spine, or, in the event the animal approaches from the opposite direction with his head thrust forward, said spike will penetrate the head or neck, in either instance tending to kill the animal instantly and prevent torture incident to the use of other forms of trap.

I claim as my invention—

1. An animal trap, comprising a housing formed with a barrel and a slide bearing portion, a jaw device mounted for reciprocation in the slide bearing portion and adapted to be extended therefrom when set, a spring in said barrel, which spring is attached at one end to said jaw device and at the other end to said housing, and a trigger device adapted to hold said jaw device in extended position.

2. An animal trap, comprising a housing formed with a barrel and a slide bearing portion, a jaw device slidingly mounted in said bearing portion and adapted to be extended therefrom when set, a spring in said barrel adapted to be attached to said jaw device at one end, a cap on said barrel formed with a hole, a bolt in said hole on the cap and engaging the opposite end of said spring, spring adjusting means connecting said bolt and cap, and a trigger device carried by the housing and adapted to engage said jaw device in extended position and hold it against the action of said spring.

3. An animal trap, comprising a housing formed of a barrel and a slide bearing portion, a jaw device mounted for reciprocation in said bearing portion, a spring in the barrel connecting said jaw device and housing, ears on the housing, a trigger pivoted in the barrel and a pan pivoted on said ears and adapted to engage said trigger, said trigger being adapted to engage said jaw device when set.

4. In an animal trap, a housing formed with a relatively flat slide bearing portion open at one end and substantially closed at the opposite end, and a barrel bisecting said bearing portion and communicating therewith, ears on said bearing portion on opposite sides of said barrel, said barrel being formed with a notch between said ears, a jaw device mounted for reciprocation in said bearing portion, a trigger pivoted on and adapted to extend at times transversely of said barrel and through said notch and also adapted to engage said jaw device when set, and a pan journaled on said ears and adapted to be moved through an arc relative to said bearing portion and also adapted to engage said trigger.

HENRY C. DORTON.